United States Patent
Sonoda et al.

(10) Patent No.: US 8,493,532 B2
(45) Date of Patent: Jul. 23, 2013

(54) LIQUID CRYSTAL DISPLAY DEVICE AND MANUFACTURING METHOD THEREOF

(71) Applicants: Hidehiro Sonoda, Mobara (JP); Chikae Matsui, Mobara (JP); Noboru Kunimatsu, Chiba (JP); Yuko Matsumoto, Onjuku (JP)

(72) Inventors: Hidehiro Sonoda, Mobara (JP); Chikae Matsui, Mobara (JP); Noboru Kunimatsu, Chiba (JP); Yuko Matsumoto, Onjuku (JP)

(73) Assignees: Hitachi Displays, Ltd., Chiba-Ken (JP); Panasonic Liquid Crystal Display Co., Ltd., Hyogo-Ken (JP)

( * ) Notice: Subject to any disclaimer, the term of this patent is extended or adjusted under 35 U.S.C. 154(b) by 0 days.

(21) Appl. No.: 13/723,268

(22) Filed: Dec. 21, 2012

(65) Prior Publication Data

US 2013/0114031 A1     May 9, 2013

Related U.S. Application Data

(63) Continuation of application No. 13/325,314, filed on Dec. 14, 2011, now Pat. No. 8,339,549, and a continuation of application No. 12/948,899, filed on Nov. 18, 2010, now Pat. No. 8,085,372.

(30) Foreign Application Priority Data

Nov. 19, 2009   (JP) ................................. 2009-263616

(51) Int. Cl.
    *G02F 1/1337*     (2006.01)

(52) U.S. Cl.
    USPC ............... 349/123; 349/56; 349/84; 349/122; 349/128

(58) Field of Classification Search
    USPC .............................. 349/56, 84, 122, 123, 128
    See application file for complete search history.

(56) References Cited

U.S. PATENT DOCUMENTS

| | | | |
|---|---|---|---|
| 6,583,835 B1 | 6/2003 | Yoshida et al. | |
| 7,220,467 B2 | 5/2007 | Nam | |
| 7,859,625 B2 | 12/2010 | Sonoda et al. | |
| 7,903,230 B2 * | 3/2011 | Kitamura | 349/190 |
| 8,085,372 B2 | 12/2011 | Sonoda et al. | |
| 2003/0202143 A1 * | 10/2003 | Yoshida et al. | 349/123 |

FOREIGN PATENT DOCUMENTS

JP     2007-033672     2/2007

* cited by examiner

*Primary Examiner* — Jennifer Doan
(74) *Attorney, Agent, or Firm* — Antonelli, Terry, Stout & Kraus, LLP.

(57) ABSTRACT

A liquid crystal display device has a liquid crystal display panel including pixels each having an active device, a pixel electrode, a common electrode and a liquid crystal layer arranged in a dot matrix array. The liquid crystal display panel has a first substrate, a second substrate, and a liquid crystal layer provided between the first substrate and the second substrate. The first substrate has the active device, the pixel electrode, the common electrode and a first alignment film. The second substrate has a second alignment film. The first alignment film and the second alignment film are respectively a photo alignment film formed by irradiating a photo decomposition type insulating film with light. The second alignment film has a thickness of at least 10 nm and no greater 50 nm and is thinner than the first alignment film.

6 Claims, 5 Drawing Sheets

LIQUID CRYSTAL DISPLAY DEVICE AND MANUFACTURING METHOD THEREOF

CROSS REFERENCE TO RELATED APPLICATIONS

This application is a continuation of U.S. Application Ser. No. 13/325,314, filed Dec. 14, 2011, which, in turn, is a continuation of U.S. application Ser. No. 12/948,899, filed Nov. 18, 2010 (now U.S. Pat. No. 8,085,372), the contents of which are incorporated herein by reference.

CLAIM OF PRIORITY

The present application claims priority from Japanese Patent Application JP 2009-263616 filed on Nov. 19, 2009, the content of which is hereby incorporated by reference into this application.

BACKGROUND OF THE INVENTION

Description of Related Art

The present invention relates to a liquid crystal display device and a manufacturing method thereof, and more particularly, to a technique effectively applicable to an IPS (In-Plane Switching) mode liquid crystal display device using a photo decomposition type alignment film to control the alignment of a liquid crystal layer.

Conventionally, an active matrix driving type liquid crystal display device (hereinbelow, simply referred to as a "liquid crystal display device") is widely used in a liquid crystal television set, a liquid crystal display for a personal computer, a liquid crystal display for a mobile electronic device and the like.

These liquid crystal display devices respectively have a liquid crystal display panel where a liquid crystal layer is encapsulated between a pair of substrates. The liquid crystal display panel has a display region having plural pixels in a dot matrix array. In each pixel, which has an active device, a pixel electrode, a common electrode and a liquid crystal layer, the alignment of the liquid crystal layer is changed and the light transmittance is changed in accordance with the level of potential difference between the pixel electrode and the common electrode. Further, the methods of arrangement of the pixel electrode and the common electrode are briefly classified into providing these electrodes on different substrates and providing the electrodes on the same substrate.

As a liquid crystal layer operation mode (alignment changing method) in a liquid crystal display panel where the pixel electrode and the common electrode are provided on different substrates, e.g., TN (Twisted Nematic) mode, STN (Super Twisted Nematic) mode and VA (Vertically Aligned or Vertical Alignment) mode are well known. Further, as a liquid crystal layer operation mode in a liquid crystal display panel where the pixel electrode and the common electrode are provided on the same substrate, for example, the IPS mode and FFS (Fringe Field Switching) mode are well known.

In the IPS mode liquid crystal display panel, the alignment of the liquid crystal layer is homogeneous when there is no potential difference between the pixel electrode and the common electrode. Upon application of potential difference between the pixel electrode and the common electrode, a so-called lateral electric field mainly having a component parallel to the substrate plane is applied to the liquid crystal layer, thereby the alignment of the liquid crystal layer is changed. At this time, the change of the alignment of the liquid crystal layer is made mainly by rotation of liquid crystal molecules in a plane approximately parallel to the substrate plane and the change of the tilt angle of the liquid crystal molecules is small. Accordingly, in the IPS mode liquid crystal display panel, as the change of effective value of retardation accompanying voltage application is small, a display with excellent tone reproduction in a wide view angle range can be produced.

In addition to the IPS mode liquid crystal display panel, conventional general liquid crystal display panels have an alignment film to control liquid crystal layer alignment when no electric field is applied.

Conventionally, the alignment film is generally formed by, after formation of a dielectric film such as a polyimide film, performing rubbing processing on the surface of the dielectric film.

However, the formation of the alignment film by performing the rubbing processing on the surface of the dielectric film has a problem that some of the dielectric film peeled by the rubbing processing remains and is mixed with the liquid crystal layer which causes deterioration of display quality.

Accordingly, in the recent manufacturing method of liquid crystal display panel, the alignment film is formed by irradiation of the photo decomposition type dielectric film with predetermined light (for example, ultraviolet light having an emission line in a 240 nm to 400 nm wavelength band).

However, when the alignment film formed by irradiation of the dielectric film with light (hereinbelow, referred to as a "photo alignment film") is used, it is necessary to increase the amount of light irradiation to obtain practical alignment (for example, homogeneousness of the alignment of the liquid crystal layer or the like when no electric-field is applied). Accordingly, the conventional photo alignment film is generally colored in yellow, and the light transmittance is lowered. Therefore, in the liquid crystal display panel having the photo alignment film, the light transmittance in each pixel is lowered by the reduction of the light transmittance in the photo alignment film.

In the IPS mode liquid crystal display panel, to prevent the reduction of the light transmittance due to coloration of the photo alignment film, e.g., a method of reducing the amount of light irradiation in formation of a photo alignment film on the substrate without the active device, the pixel electrode and the like (hereinbelow, referred to as an "opposite substrate") of the pair of substrates to a smaller amount than the amount of irradiation in formation of the other photo alignment film on the substrate having the active device, the pixel electrode and the like (hereinbelow, referred to as a "TFT substrate"), has been proposed (for example, see JPA NO. 2007-033672).

However, in the IPS mode liquid crystal display panel, when the amount of light irradiation is small in formation of the photo alignment film on the opposite substrate side, the alignment of the photo alignment film is deteriorated, and an after image easily occurs due to the deterioration of the alignment.

Accordingly, when the amount of light irradiation is small in formation of the photo alignment film on the opposite substrate side, it is necessary to control the amount of light irradiation such that an after image occurs within an allowable range.

In the liquid crystal display panel disclosed in JPA NO. 2007-033672, as an example of the amount of light irradiation in formation of the photo alignment film on the opposite substrate side, with 30% of the amount of irradiation in formation of the photo alignment film on the TFT substrate side as a lower limit, the amount of light irradiation is desirably 40% to 50%.

That is, the conventional IPS mode liquid crystal display panel having a photo alignment film has a problem that it is difficult to achieve both suppression of reduction of light transmittance due to coloration of the photo alignment film and suppression of occurrence of after image due to the reduction of alignment of the photo alignment film.

SUMMARY OF THE INVENTION

The present invention has been made in consideration of the above situation, and provides a technique to achieve both improvement in light transmittance and suppression of occurrence of after image in an IPS mode liquid crystal display panel having e.g. a photo alignment film.

The above-described features and novel features of the present invention will be made clear from the descriptions of the specification and the accompanying drawings.

Among aspects of the present invention disclosed in the present application, the outline of typical aspect is as follows.

According to an aspect of the present invention, there is provided a liquid crystal display device having a liquid crystal display panel including pixels each having an active device, a pixel electrode, a common electrode and a liquid crystal layer arranged in a dot matrix array, the liquid crystal display panel having a first substrate, a second substrate, and a liquid crystal layer provided between the first substrate and the second substrate, the first substrate having the active device, the pixel electrode, the common electrode and a first alignment film, the second substrate having a second alignment film, and the first alignment film and the second alignment film being respectively a photo alignment film formed by irradiating a photo decomposition type insulating film with light, wherein the second alignment film is thinner than the first alignment film, and has a thickness of equal to or greater than 10 nm and equal to or less than 50 nm.

In the above-described liquid crystal display apparatus, the first alignment film has a thickness of equal to or greater than 80 nm and equal to or less than 130 nm.

According to another aspect of the present invention, there is provided a liquid crystal display device manufacturing method including: a first step of forming a first substrate having a first alignment film; a second step of forming a second substrate having a second alignment film; and a third step of attaching the first substrate and the second substrate to each other, and encapsulating a liquid crystal layer between the pair of substrates, the first alignment film and the second alignment film being respectively formed by performing alignment processing to irradiate a photo decomposition type insulating film with light on a previously determined condition, wherein the first step has: a step of forming a first thin film laminated body having a plurality of scanning signal lines, a plurality of video image signal lines, a plurality of active devices, a plurality of pixel electrodes, a common electrode, and a plurality of insulating layers, on a first insulating substrate; and a step of forming the first alignment film on the first thin film laminated body, and wherein the second alignment film is formed to be thinner than the first alignment film, and to have a thickness after the alignment processing equal to or greater than 10 nm and equal to or less than 50 nm.

In the above-described the liquid crystal display apparatus manufacturing method, the first alignment film is formed to have a thickness after the alignment processing equal to or greater than 80 nm and equal to or less than 130 nm.

Further, in the above-described the liquid crystal display apparatus manufacturing method, an amount of light irradiated to perform the alignment processing on the second alignment film is equal to or greater than 10% and equal to or less than 50% of an amount of light irradiated to perform the alignment processing on the first alignment film.

Further, in the above-described the liquid crystal display apparatus manufacturing method, the second step has: a step of forming a second thin film laminated body, having a plurality of color filters and a planarized layer, on the second insulating substrate; and a step of forming the second alignment film on the second thin film laminated body.

In accordance with the liquid crystal display device and the manufacturing method of the liquid crystal display device according to the present invention, it is possible to achieve both improvement in light transmittance and suppression of occurrence of after image in a liquid crystal display panel having a photo alignment film.

DETAILED DESCRIPTION OF THE PREFERRED EMBODIMENTS

Figure 1:
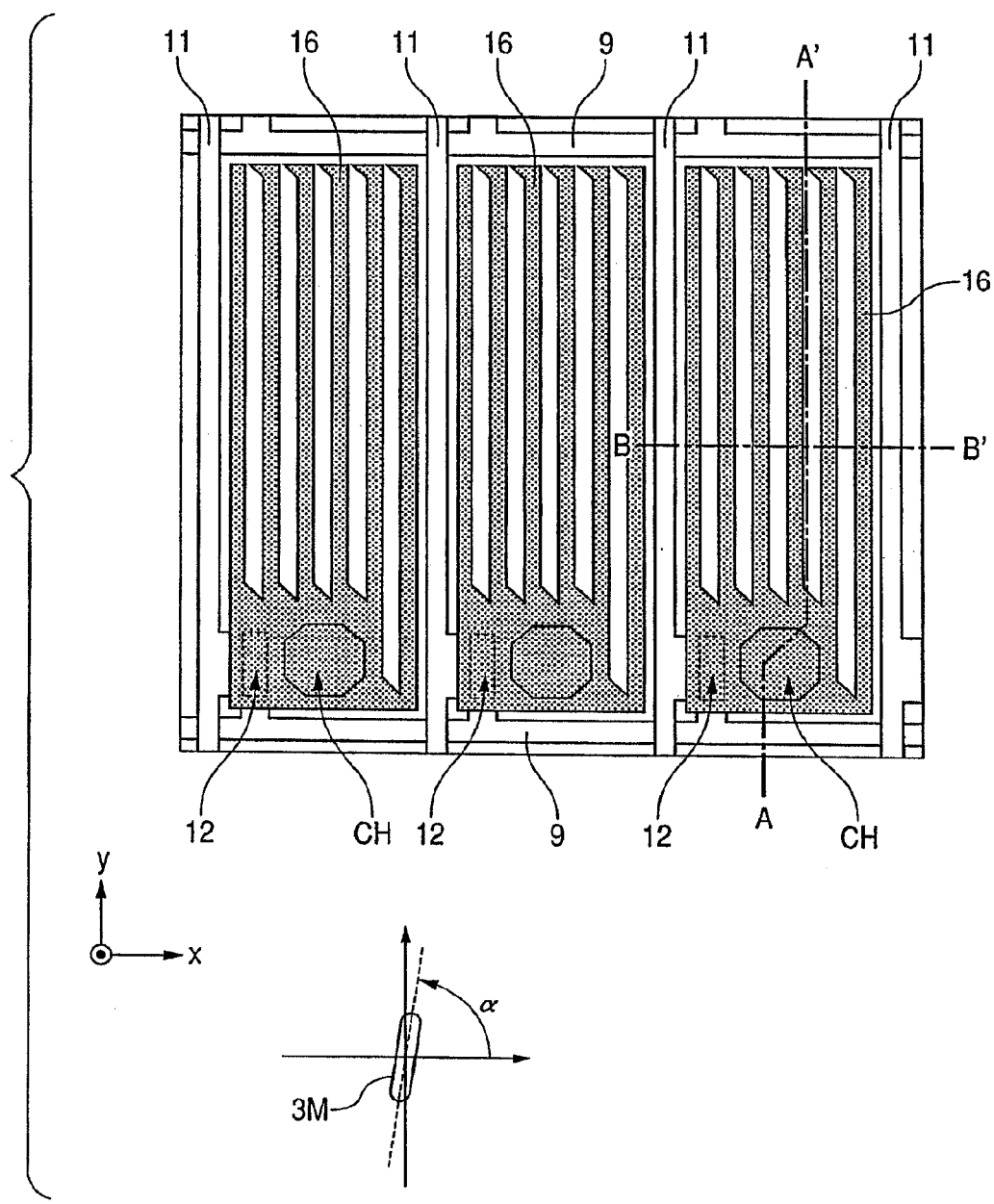
FIG. 1 is a schematic plane view showing an example of a plane structure of pixels in a liquid crystal display panel according to a first embodiment of the present invention.

Hereinbelow, the present invention will be described in detail with embodiments in accordance with the accompanying drawings.

Note that in all the figures for explanation of the embodiments, elements having the same function will have the same reference numerals and repeated explanations thereof will be omitted.

First Embodiment

FIGS. 1 to 4 schematically illustrate the structure of a liquid crystal display panel according to a first embodiment of the present invention.

Figure 2:
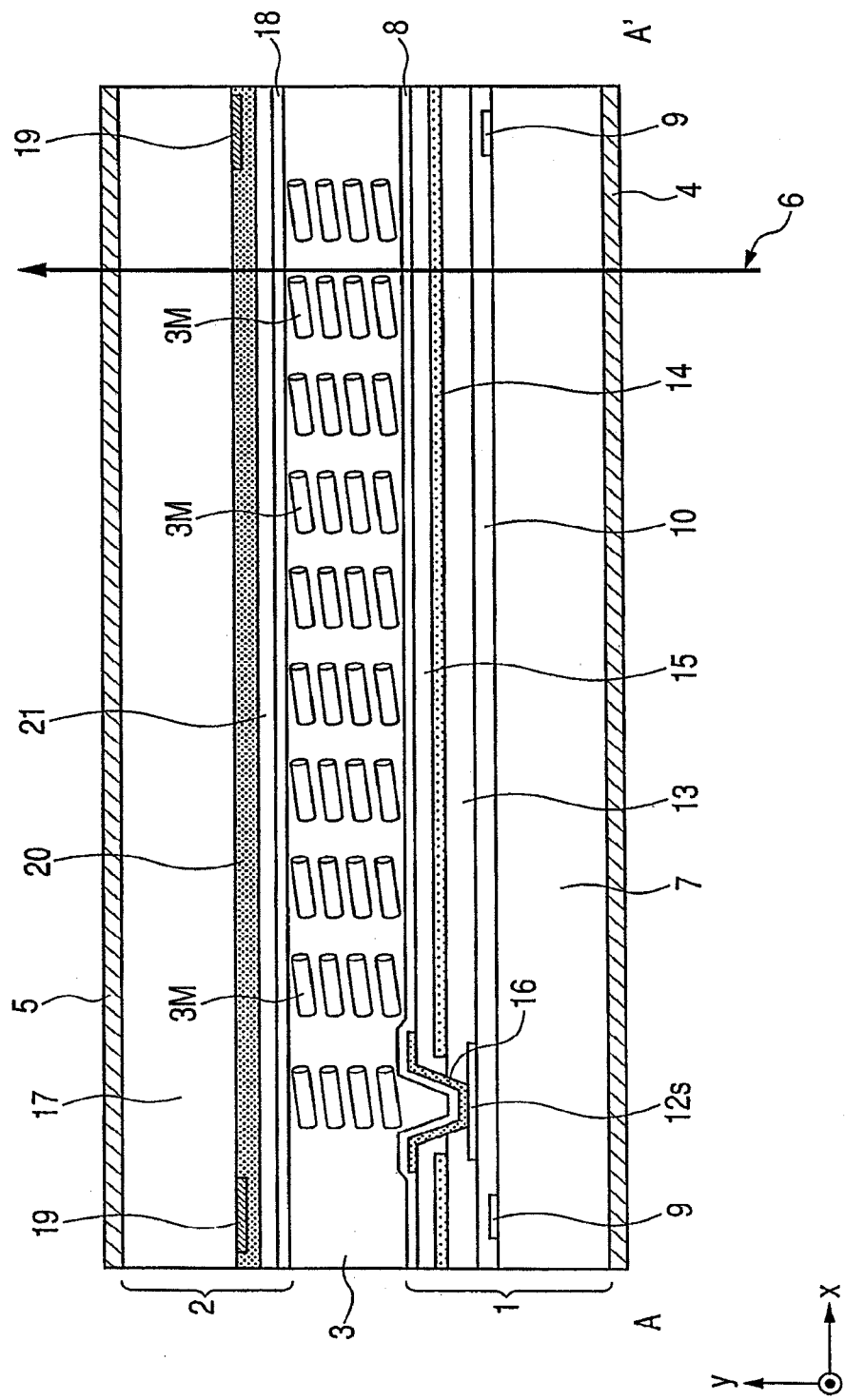
FIG. 2 is a schematic cross-sectional view showing an example of a cross-sectional structure along a line A-A' in FIG. 1.
Figure 3:
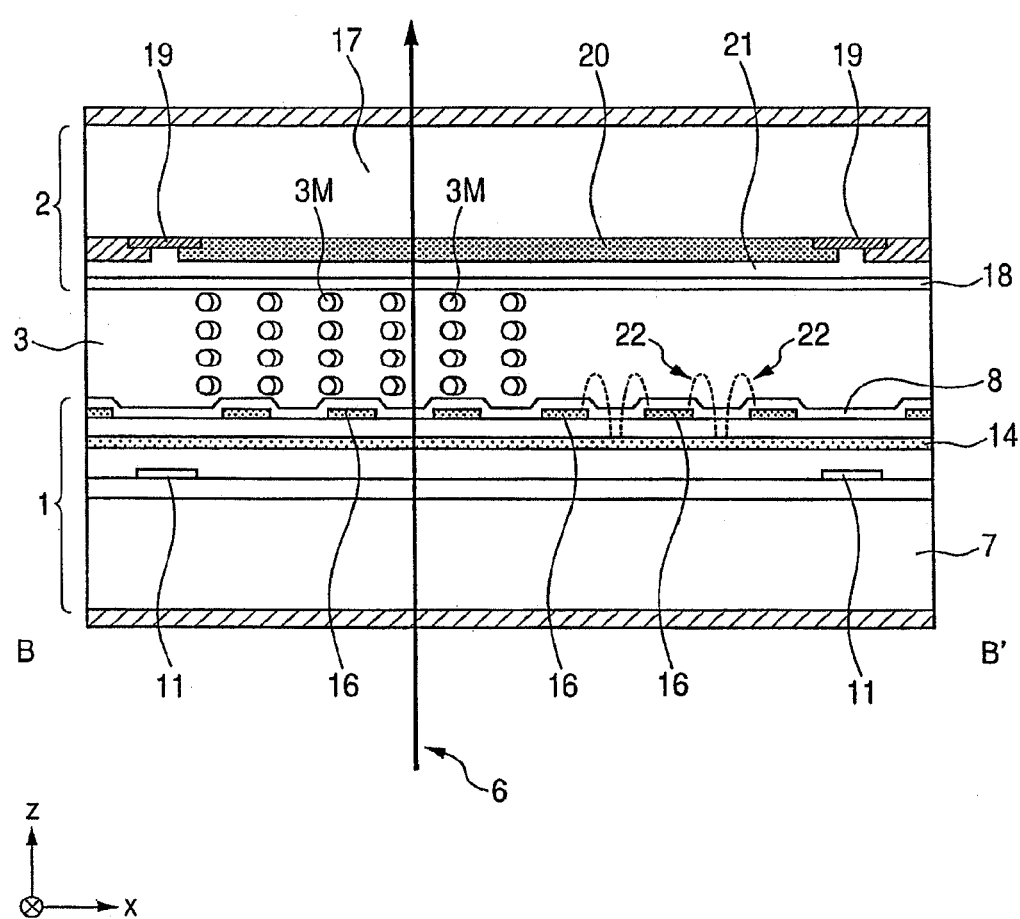
FIG. 3 is a schematic cross-sectional view showing an example of a cross-sectional structure along a line B-B' in FIG. 1.
Figure 4:
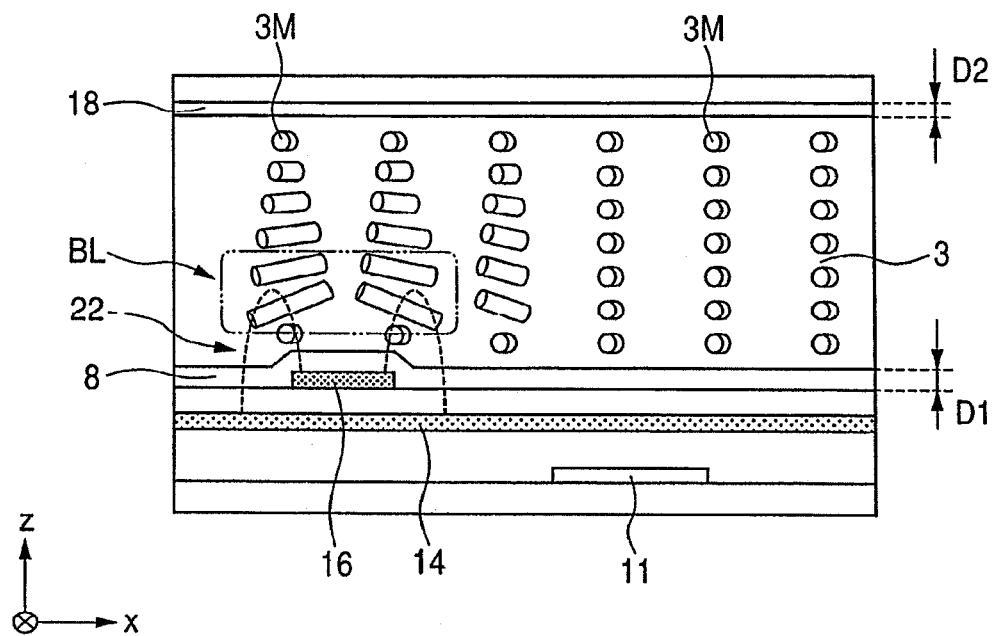
FIG. 4 is a schematic cross-sectional view showing an example of an operation of pixels (liquid crystal layer) in the liquid crystal display panel according to the first embodiment.

FIG. 1 is a schematic plane view showing an example of a plane structure of pixels in a liquid crystal display panel according to the first embodiment of the present invention. FIG. 2 is a schematic cross-sectional diagram showing an example of a cross-sectional structure along a line A-A' in FIG. 1. FIG. 3 is a schematic cross-sectional diagram showing an example of the cross-sectional structure along a line B-B' in FIG. 1. FIG. 4 is a schematic cross-sectional diagram showing an example of an operation of pixels (liquid crystal layer) in the liquid crystal display panel according to the first embodiment.

In the first embodiment, as an example of the liquid crystal display device according to the present invention, a liquid crystal display device of active matrix driving type having the IPS mode as a liquid crystal layer operation mode is used. Note that the present invention relates to the structure of the liquid crystal display panel of the liquid crystal display device and more particularly relates to the structure of an alignment film. The other elements than the structure of the alignment film may be basically any of well-known elements. Accordingly, in the following description of the present specification, only the structure of the liquid crystal display panel of the liquid crystal display device according to the present invention will be described. The liquid crystal display panel according to the present invention has e.g. a first substrate 1, a second substrate 2, a liquid crystal layer 3, a first polarizing plate 4 and a second polarizing plate 5 as shown in FIGS. 1 to 3. Further, the liquid crystal display panel shown in FIGS. 1 to 3 is a so-called transmission type liquid crystal display panel to display a video image, a still image or the like by modulation of light from a backlight. Light 6 from the backlight enters e.g. from the first polarizing plate 4 side into the liquid crystal display panel. At this time, the amount of the light 6 passing through the liquid crystal display panel is changed in accordance with relation between the polarized status of the light 6 passed through the first polarizing plate 4 and the liquid crystal layer 3 and the direction of the transmission axis (absorption axis) of the second polarizing plate 5.

The first substrate 1 has a first insulating substrate 7, a first thin film laminated body formed on the first insulating substrate 7, and a first alignment film 8 formed on the first thin film laminated body. The first insulating substrate 7 is a transparent insulating substrate such as a glass substrate. The first thin film laminated body has plural scanning signal lines 9, a first insulating layer 10, plural video image signal lines 11, plural active devices 12, a second insulating layer 13, a common electrode 14, a third insulating layer 15, and a pixel electrode 16. Further, as described later, the first alignment film 8 is a photo alignment film formed by irradiating a photo decomposition type insulating film with ultraviolet light.

The second substrate 2 has a second insulating substrate 17, a second thin film laminated body formed on the second insulating substrate 17, and a second alignment film 18 formed on the second thin film laminated body. The second insulating substrate 17 is a transparent insulating substrate such as a glass substrate. The second thin film laminated body has e.g. a black matrix (light shielding film) 19, a color filter 20, and a planarized layer 21. Further, as described later, the second alignment film 18 is a photo alignment film formed by irradiating a photo decomposition type insulating film with ultraviolet light.

The liquid crystal display panel in the first embodiment has a display region having plural pixels in a dot matrix array, and each pixel has the liquid crystal layer 3, the active device 12, the pixel electrode 16, and the common electrode 14 provided on the first substrate 1. Note that FIG. 1 shows the plane structure of three pixels arrayed along an extending direction (x-direction) of the scanning signal line 9.

Further, when the liquid crystal display panel is available for RGB color display, the color filter 20 of each pixel is any one of a red color filter to transmit only red color light, a green color filter to transmit only green color light and a blue color filter to transmit only blue color light. Further, at this time, 1 dot (picture element) of a video image or a still image includes three pixels, i.e. a pixel having the red color filter, a pixel having the green color filter and a pixel having the blue color filter. The three pixels are arrayed in e.g. the extending direction (x-direction) of the scanning signal line 9.

The active device 12 is a TFT device with a part of the scanning signal line 9 as a gate electrode. A semiconductor layer (not shown) laminated via the first insulating layer 10 is provided on the gate electrode. Further, a first source-drain electrode 12s and a part of the video image signal line (second source-drain electrode) are connected to the semiconductor layer. At this time, the first source-drain electrode 12s is connected to the pixel electrode 16 with a contact hole CH.

Further, at this time, the pixel electrode 16 and the common electrode 14 are laminated via the third insulating layer 15. The pixel electrode 16 which is closer to the liquid crystal layer 3 has a comb teeth plane shape. Note that in the example shown in FIG. 1, the direction in which the teeth of the pixel electrode 16 extend is parallel to a direction in which the video image signal line 11 extends (y-direction). However, the teeth extending direction is not limited to the above direction but may be another direction.

The first alignment film 8 and the second alignment film 18 are insulating films to control the alignment of the liquid crystal layer 3 when no electric field is applied, i.e., when there is no potential difference between the pixel electrode 16 and the common electrode 14. Further, in the case of an IPS mode liquid crystal display panel, the alignment of the liquid crystal layer 3 when no electric field is applied is homogeneous. At this time, assuming that the comb teeth plane shape of the pixel electrode 16 is as shown in FIG. 1, the first alignment film 8 and the second alignment film 18 are formed such that an acute angle α formed with the longitudinal direction of the liquid crystal molecule 3M when no electric field is applied and the extending direction of the scanning signal line 9 (x-direction) is 75° to 85°.

In the pixel having the above structure, when a potential difference is applied between the pixel electrode 16 and the common electrode 14, an arch shaped electric line of force 22 passing through the liquid crystal layer 3 and connecting these electrodes is formed as shown in e.g. FIGS. 3 and 4. At this time, an electric field (so-called lateral electric field) mainly having a component parallel to the substrate plane (xy plane) is applied to the liquid crystal layer 3. When the lateral electric field is applied to the liquid crystal layer 3 in homogeneous alignment, an alignment change characteristic of IPS mode occurs. That is, as the alignment change, the alignment direction of the liquid crystal layer 3 (longitudinal direction of the liquid crystal molecule 3) is mainly rotated in the substrate plane.

Further, the alignment change of the liquid crystal layer 3 occurs in a part to which the lateral electric field is applied, i.e., a region BL shown in FIG. 4, and the change is propagated in a thickness direction (z-direction) of the liquid crystal layer 3. At this time, in the liquid crystal layer 3, rotation of the liquid crystal molecule 3M, around a boundary surface with respect to the first alignment film 8 and around a boundary surface with respect to the second alignment film 18, in the substrate plane, is suppressed by the influence of an alignment restraining force with these alignment films. As a result, the alignment status of the liquid crystal layer 3 when the lateral electric field is applied is twisted alignment as shown in FIG. 4.

The first alignment film 8 and the second alignment film 18 in the liquid crystal display panel in the first embodiment are photo alignment films respectively formed by irradiating a photo decomposition type insulating film with ultraviolet light as described above. A more particular method of forming the photo alignment film is e.g. as follows.

First, to obtain a photo decomposition type insulating material used in formation of the photo alignment film, e.g. 1.0 mol % p-phenylene diamine is solved in N-methyl-2- pyrrolidone, then 1 mol % 2-cyclobutane tetra carboxylic anhydrate is added to the solution to cause reaction for 12 hours at 20° C., thereby poly amic acid varnish, in which standard polystyrene equivalent weight average molecular weight is about 100,000 and weight average molecular weight/number average molecular weight (Mv/Mn) is about 1.6, is obtained.

Next, the poly amic acid varnish is diluted to 6% concentration, then solid content 0.3% by weight of y-amino propyl triethoxy silane is added, and then printed on the first thin film laminated body and the second thin film laminated body, and heated at 210° C. for 30 minutes, thereby a photo decomposition type insulating film (polyimide film) is formed.

Thereafter, alignment processing of irradiating the photo decomposition type polyimide film with light (ultraviolet light) from a polarizing UV lamp having an emission line in a wavelength band from e.g. 240 nm to 400 nm is performed. The alignment processing is performed by irradiating the ultraviolet light from e.g. a high pressure mercury lamp, as linear polarized light at a polarization rate of about 20:1, using a pile polarizer formed with laminated quartz substrates, at irradiation energy of about 4J/cm². At this time, the direction of the linear polarized light is orthogonal to the longitudinal direction of the liquid crystal molecule 3M when no electric field is applied.

In the case where the first alignment film 8 and the second alignment film 18 are photo alignment films formed in accordance with the above-described procedure, when the conventional forming method is used, these alignment films are colored in yellow as described above.

Further, the inventors of the present invention have found that in the case where the first alignment film 8 and the second alignment film 18 are photo alignment films formed in accordance with the above-described procedure, the coloration by irradiation with light (ultraviolet light) occurs not only in the alignment film but also in an insulating film formed of organic material such as the planarized layer 21. Further, the inventors of the present invention have manufactured a liquid crystal display panel using the first substrate 1 where the first thin film laminated body is formed of only inorganic material and the second substrate 2 where only the planarized layer 21 of the second thin film laminated body is formed of organic material, and measured the degree of coloring. It has been found as a result that the contribution ratio to reduction of transmittance in the first alignment film 8, that in the second alignment film 18, and that in the planarized layer 21 are approximately equal to each other (i.e., 1:1:1).

That is, the coloration of the first alignment film 8 and the second alignment film 18 greatly contributes to reduction of transmittance of the liquid crystal panel. Accordingly, when the first alignment film 8 and the second alignment film 18 are photo alignment films, it is necessary to suppress the amount of coloration of these alignment films to prevent reduction of the transmittance of the liquid crystal display panel.

In the conventional photo alignment film forming method, to suppress the amount of coloration, as described above, the amount of light irradiation in formation of e.g. the photo alignment film (second alignment film 18) of the second substrate 2 is smaller than the amount of light irradiation in formation of the photo alignment film (first alignment film 8) of the first substrate 1. In this method, however, as described above, it is difficult to achieve both of suppression of reduction of light transmittance due to coloration of alignment film and suppression of occurrence of after image due to deterioration of alignment.

On the other hand, in the liquid crystal display panel in the first embodiment, as shown in e.g. FIG. 4, the thickness D2 of the photo alignment film (second alignment film 18) of the second substrate 2 is thinner than the thickness D1 of the photo alignment film (first alignment film 8) of the first substrate 1, thereby it is possible to achieve both suppression of the reduction of light transmittance due to coloration of the alignment film and suppression of occurrence of after image due to deterioration of alignment.

Figure 5:
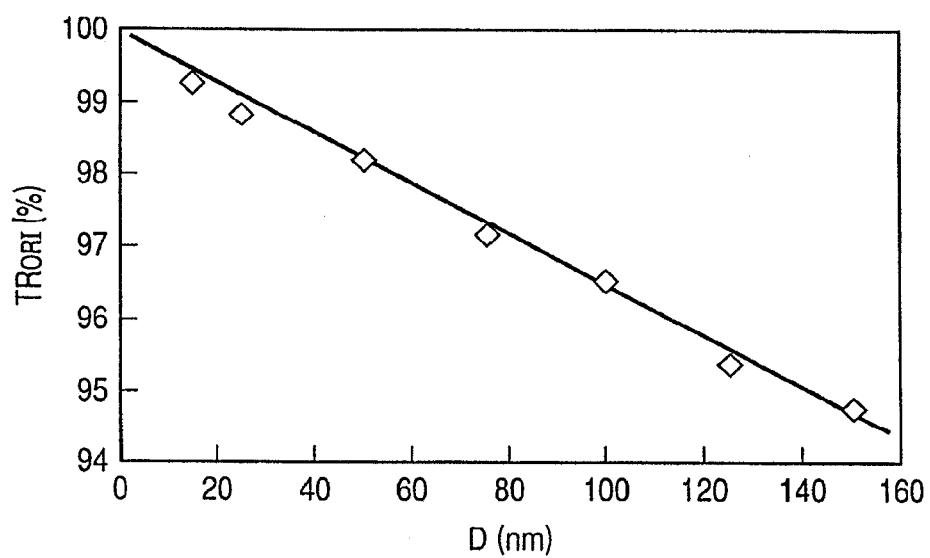
FIG. 5 is a graph showing an example of relation between thickness of an alignment film and light transmittance.
Figure 6:
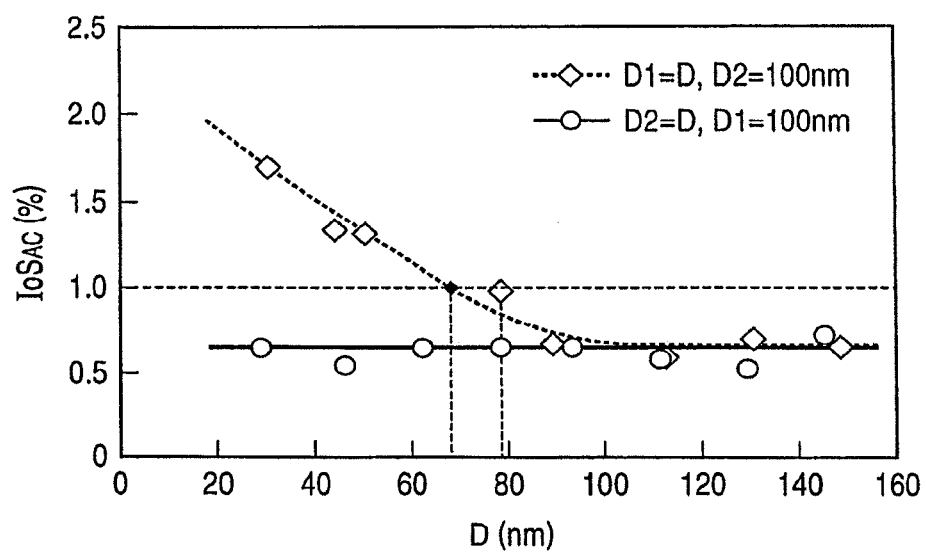
FIG. 6 is a graph showing an example of relation between the thickness of the alignment film and AC after image intensity.

FIGS. 5 and 6 are schematic diagrams for explanation of preferable values of the thickness of the first alignment film and the second alignment film in the liquid crystal display panel in the first embodiment.

FIG. 5 schematically shows an example of relation between the thickness of the alignment film and the light transmittance. FIG. 6 schematically shows an example of relation between the thickness of the alignment film and AC after image intensity.

Note that FIG. 5 is a graph with a lateral axis as the thickness D (nm) of the alignment film, and a vertical axis as light transmittance $TR_{ORI}$ (%). Further, in FIG. 5, rhombic points indicate the results of measurement by the inventors of the present invention, and a right-downward straight line, a regression straight line obtained from the results of measurement.

Further, FIG. 6 is a graph with a lateral axis as the thickness D (nm) of the alignment film, and a vertical axis as AC after image intensity $IoS_{AC}$(%). Further, in FIG. 6, outline rhombic points indicate the results of measurement of the AC after image intensity $IoS_{AC}$ when the thickness D1 of the first alignment film 8 is changed while the thickness D2 of the second alignment film 18 is fixedly 100 nm, and a dotted curve indicates a regression curve obtained from the results the measurement. Further, in FIG. 6, outline round points indicate the results of measurement of the AC after image intensity $IoS_{AC}$ when the thickness D2 of the second alignment film 18 is changed while the thickness D1 of the first alignment film 8 is fixedly 100 nm, and a solid curve indicates a regression curve obtained from the results of measurement.

The inventors of the present invention have examined the relation between the thickness of the photo alignment film and the light transmittance, and obtained e.g. the results as shown in FIG. 5. Note that FIG. 5 shows the relation between the thickness of a photo alignment film and the light transmittance when only the photo alignment film is formed on a glass substrate having the same thickness as that of the first insulating substrate 7 or the second insulating substrate 18. Further, the photo alignment film is formed in accordance with the above-described procedure. The irradiation amount of light (ultraviolet light) is a constant amount (e.g., light at irradiation energy of 4 mW/cm² is irradiated for 16 minutes 40 seconds to achieve accumulated irradiation amount of 4 J/cm²) regardless of thickness.

As it is apparent from FIG. 5, even when the light irradiation amount is constant, the light transmittance $TR_{ORI}$ of the photo alignment film increases as the thickness D of the photo alignment film becomes thinner. Accordingly, it is considered that the reduction of light transmittance due to coloration can be suppressed without impairing the alignment of these alignment films by thinning the first alignment film 8 and the second alignment film 18.

Accordingly, when the degree (intensity) of an after image when the first alignment film 8 and the second alignment film 18 are thinned is about the same as that when the conventional first alignment film and the second alignment film have a general thickness (e.g. about 100 nm), it is considered that the reduction of light transmittance due to coloration of alignment film can be suppressed and the occurrence of after image due to deterioration of alignment can be suppressed.

Then, the inventors of the present invention have examined the degree (intensity) of an after image when the first alignment film 8 and the second alignment film 18 are thinned, and obtained e.g. the results as shown in FIG. 6. Note that in FIG. 6, in a case where a window pattern at a maximum brightness is displayed on a screen for 30 minutes and the pattern on the screen with the brightness changed to 10% of the maximum brightness is displayed for 2 minutes, the luminance fluctuation $\Delta B/B_{10\%}$ between an after image part of the window pattern and brightness B in a peripheral intermediate halftone part is shown as the AC after image intensity $IoS_{AC}$.

The AC after image intensity $IoS_{AC}$ on the vertical axis in the graph shown in FIG. 6 is the intensity of an after image as an index of after image in the IPS mode liquid crystal display panel, which is related to e.g. the alignment restraining force of the liquid crystal layer 3 with the first alignment film 8, and the alignment restraining force of the liquid crystal layer 3 with the second alignment film 18.

As it is apparent from FIG. 6, when the thickness of the first alignment film 8 is changed while the thickness of the second alignment film 18 is fixed, within a range where the thickness D1 of the first alignment film 8 is equal to or less than 100 nm, the AC after image intensity $IoS_{AC}$ is increased as the thickness D1 becomes thinner. In this manner, it is considered that in the range where the thickness D1 of the first alignment film 8 is equal to or less than 100 nm, the AC after image intensity $IoS_{AC}$ depends on the thickness because when the thickness D1 of the first alignment film 8 is thinner, an electric field applied around the surface boundary of the liquid crystal layer 3 with respect to the first alignment film 8 is relatively intensified and the twist of the liquid crystal molecule 3M is increased.

On the other hand, as it is apparent from FIG. 6, when the thickness of the second alignment film 18 is changed while the thickness of the first alignment film 8 is fixed, even when the thickness D2 of the second alignment film 18 is within the range of 100 nm, the AC after image intensity $IoS_{AC}$ is approximately constant equal to or less than 1.0%. In this manner, it is considered that the AC after image intensity $IoS_{AC}$ is approximately constant regardless of the thickness D2 of the second alignment film 18 because no electric field is applied to around the boundary surface of the liquid crystal layer 3 with respect to the second alignment film 18 and the change of the thickness D2 of the second alignment film 18 does not influence the degree of twist of the liquid crystal molecule 3M.

To obtain a practical after image characteristic in the IPS mode liquid crystal display device, it is necessary to suppress the AC after image intensity $IoS_{AC}$ to or less than 1.0%. Therefore, to suppress the reduction of transmittance due to coloration and suppress the occurrence of after image, as it is understood from FIG. 6, it is desirable that the thickness D1 of the first alignment film 8 is as thin as possible but equal to or greater than 80 nm, e.g., equal to or greater than 80 nm and equal to or less than 130 nm. Note that the first alignment film 8 is formed by printing or coating photo decomposition insulating material as described above. Accordingly, in consideration of thickness variation occurred in formation of the first alignment film 8, the thickness D1 of the first alignment film 8 is desirably equal to or greater than 90 nm and equal to or less than 110 nm.

Further, at this time, it is desirable that the thickness D2 of the second alignment film 18 is as thin as possible. However, as described above, the second alignment film 18 is formed by printing or coating photo decomposition type insulating material. Accordingly, when the thickness D2 of the second alignment film 18 is too thin, an opening defect such as a so-called pin hole often occurs. According to the research by the inventors of the present invention, the number (density) of pin holes when the thickness D2 of the second alignment film 18 is 10 nm is within an allowable range, while when the number (density) of pin holes when the thickness D2 is 5 nm is without the allowable range, and the alignment of the liquid crystal layer 3 when no electric field is applied is deteriorated. Accordingly, it is desirable that the thickness D2 of the second alignment film 18 is e.g. equal to or greater than 10 nm to equal to or less than 50 nm.

Based on the above-described study, the inventors of the present invention have manufactured plural liquid crystal display panels with different combinations of the thickness D1 of the first alignment film 8 and the thickness D2 of the second alignment film 18, then compared the light transmittance and the AC after image intensities, and obtained the results as shown in the following Table 1.

| PT | D1 (nm) | D2 (nm) | $TR_{LCD}$ (%) | $\Delta TR$ (%) | $IoS_{AC}$ (%) |
|---|---|---|---|---|---|
| PT1 | 100 | 100 | 4.49 | — | 0.7 |
| PT2 | 50 | 50 | 4.66 | +0.17 | 1.3 |
| PT3 | 100 | 50 | 4.57 | +0.08 | 0.7 |
| PT4 | 100 | 10 | 4.64 | +0.15 | 0.7 |
| PT5 | 80 | 10 | 4.67 | +0.18 | 0.7 |

Note that five types of liquid crystal display panels PT1 to PT5 shown in the Table 1 are manufactured with the same condition regarding constituents except that the combinations of the thickness D1 of the first alignment film 8 and the thickness D2 of the second alignment film 18 are different. Further, the liquid crystal layer 3 is formed by vacuo-injecting a nematic liquid crystal composition A, with a positive anisotropic dielectric constant $\Delta\in$ having a value of 10.2 (1 kHz, 20° C.), an anisotropic refraction factor $\Delta n$ having a value of 0.075 (wavelength of 590 nm, 20° C.), a twist elastic constant K2 having a value of 7.0 pN, and a nematic-isotropic phase transition temperature T (N–1) of about 76° C., and sealing with a sealing material of ultraviolet curing resin. Further, at this time, the thickness of the liquid crystal layer 3 (cell gap) is 4.8 μm, and retardation And is 0.36 μm. Further, the liquid crystal layer 3 is aligned such that the longitudinal direction of the liquid crystal molecular 3M when no electric field is applied is inclined by 75 degrees with respect to the direction of electric field application (the direction in which the scanning signal line 9 extends). Further, the respective absorption axes of the first polarizing plate 4 and the second polarizing plate 5 are orthogonal to each other and the absorption axis of the first polarizing plate 4 is orthogonal to the longitudinal direction of the liquid crystal molecule 3M when no electric field is applied.

In the Table 1, the liquid crystal display panel PT1 is a liquid crystal display panel as a first comparative example for comparison with the liquid crystal display panel in the first embodiment, where the thickness D1 of the first alignment film 8 and the thickness D2 of the second alignment film 18 are 100 nm. Further, the liquid crystal display panel as the first comparative example (PT1) is manufactured by the conventional manufacturing method. In the liquid crystal display panel as the first comparative example (PT1), the light transmittance $TR_{LCD}$ is 4.49% and the AC after image intensity $IoS_{AC}$ is 0.7%.

Further, as it is apparent from the Table 1, in the liquid crystal display panel as the second comparative example (PT2) where the thickness D1 of the first alignment film 8 and the thickness D2 of the second alignment film 18 are 50 nm, although the light transmittance $TR_{LCD}$ is improved in comparison with the first comparative example, as the AC after image intensity $IoS_{AC}$ is 1.3%, it is impossible to achieve both the prevention of the reduction of light transmittance and the suppression of the occurrence of after image.

On the other hand, in the respective liquid crystal display panel (PT3) where the thickness D1 of the first alignment film 8 is 100 nm and the thickness D2 of the second alignment film 18 is 50 nm, the liquid crystal display panel (PT4) where the thickness D1 of the first alignment film 8 is 100 nm and the thickness D2 of the second alignment film 18 is 10 nm, the liquid crystal display panel (PT5) where the thickness D1 of the first alignment film 8 is 80 nm and the thickness D2 of the second alignment film 18 is 10 nm, the light transmittance $TR_{LCD}$ is improved in comparison with the first comparative example, and the AC after image intensity $IoS_{AC}$ is 0.7%. The combinations of the thickness D1 of the first alignment film 8 and the thickness D2 of the second alignment film 18 in these liquid crystal display panels (PT3 to PT5) satisfy the above-described combinations (80 nm≦D1≦130 nm, 10 nm≦D2612 50 nm). Further, the differences ΔTR between the light transmittance $TR_{LCD}$ in the liquid crystal display panel (PT1) as the first comparative example and the light transmittance $TR_{LCD}$ in these liquid crystal display panels (PT3 to PT5) are +0.08%, +0.15% and +0.18%, and as relative values, with the light transmittance $TR_{LCD}$ in the liquid crystal display panel (PT1) as the first comparative example as "1", 1.02, 1.03 and 1.04. That is, it is considered that in the liquid crystal display panel in the first embodiment, in comparison with the liquid crystal display panel as the first comparative example, the light transmittance can be improved by 2% or greater.

Accordingly, in the liquid crystal display panel in the first embodiment, it is possible to achieve prevention of the reduction of light transmittance due to coloration of the first alignment film 8 and the second alignment film 18 and suppression of the occurrence of after image.

Second Embodiment

Figure 7:
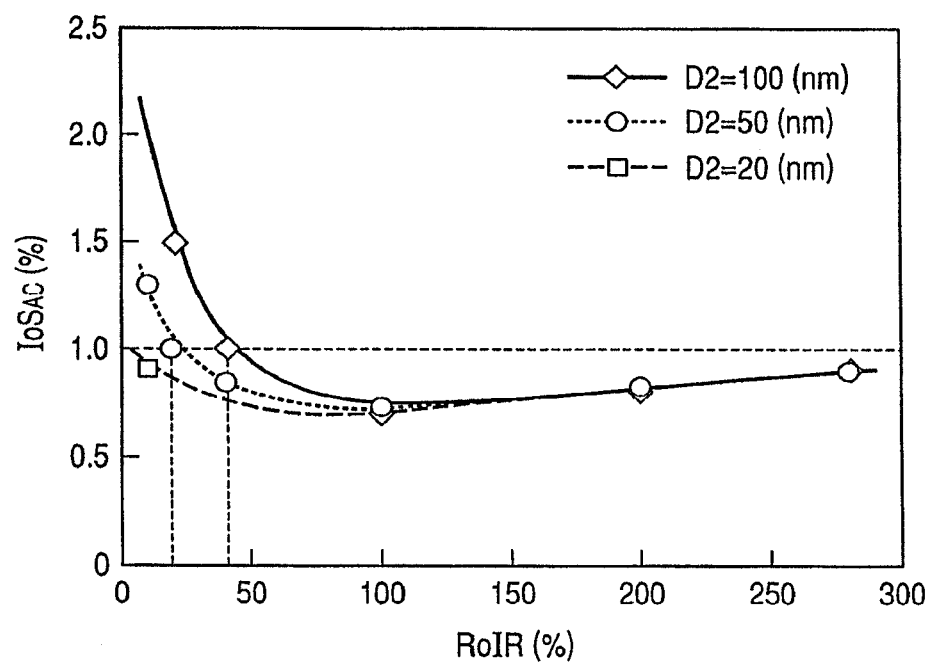
FIG. 7 is a graph for explanation of the essential point of the liquid crystal display panel according to a second embodiment of the present invention.

FIG. 7 schematically shows the essential point of the liquid crystal display panel according to a second embodiment of the present invention.

Note that FIG. 7 is a graph with a lateral axis as a relative value RoIR (%) of light irradiation amount in formation of the second alignment film 18, and a vertical axis as the AC after image intensity $IoS_{AC}$ (%). Further, regarding the relative value RoIR (%) of light irradiation amount, an irradiation amount the same as that in formation of the first alignment film 8 is 100%.

Further, in FIG. 7, outline rhombic points indicate results of measurement of the AC after image intensity $IoS_{AC}$ when the thickness D2 of the second alignment film 18 is 100 nm and the thickness D1 of the first alignment film 8 is 100 nm and when the light irradiation amount in formation of the second alignment film 18 is changed, and a solid curve indicates a regression curve obtained from the results of measurement. Further, in FIG. 7, outline round points indicate results of measurement of the AC after image intensity $IoS_{AC}$ when the thickness D2 of the second alignment film 18 is 50 nm and the thickness D1 of the first alignment film 8 is 100 and when the light irradiation amount in formation of the second alignment film 18 is changed, and a dotted curve indicates a regression curve obtained from the results of measurement. Further, in FIG. 7, outline rectangular points indicate results of measurement of the AC after image intensity $IoS_{AC}$ when the thickness D2 of the second alignment film 18 is 20 nm and the thickness D1 of the first alignment film 8 is 100 nm and when the light irradiation amount in formation of the second alignment film 18 is changed, and a broken curve indicates a regression curve obtained from the results of measurement.

The liquid crystal display panel in the second embodiment is an application of the first embodiment, in which when the light irradiation amount in formation of the second alignment film 18 is reduced to an amount smaller than that in formation of the first alignment film 8 as in JPA NO. 2007-033672, thereby the amount of coloration of the second alignment film 18 is further reduced.

As in the case of the liquid crystal display panel in the first embodiment, in a case where the thickness D2 of the second alignment film 18 is equal to or greater than 10 nm and equal to or less than 50 nm, when the relation between the relative value RoIR of light irradiation amount in formation of the second alignment film 18 and the AC after image intensity $IoS_{AC}$ is examined, the results as shown in e.g. FIG. 7 are obtained. Note that FIG. 7 shows the relation in the conventional technique (when the thickness of the second alignment film 18 is 100 nm) in addition to the relation between the relative value RoIR of light irradiation amount and the AC after image intensity $IoS_{AC}$ when the thickness D2 of the second alignment film 18 is 50 nm, and 20 nm, satisfying the conditions of the first embodiment.

In the conventional technique, as it is apparent from FIG. 7, when the relative value RoIR of light irradiation amount in formation of the second alignment film 18 is less than about 40%, the AC after image intensity $IoS_{AC}$ is greater than 1.0%.

On the other hand, in a case where the thickness D2 of the second alignment film 18 is 50 nm, the AC after image intensity IoSAC is greater than 1.0% when the relative value RoIR of light irradiation amount in formation of the second alignment film 18 is less than about 20%. Further, in a case where the thickness D2 of the second alignment film 18 is 20 nm, even when the relative value RoIR of light irradiation amount in formation of the second orientation film 18 is about 10%, the AC after image intensity $IoS_{AC}$ is less than 1.0%.

As a factor of suppression of after image by thinning the thickness D2 of the second alignment film 18, although the details are unknown, it is considered as follows. When the film strength of the second alignment film 18 is lowered, a shift easily occurs in the direction of alignment due to torque of the liquid crystal molecule 3M to which a lateral electric field is applied, then the alignment is deteriorated and an after image easily occurs. Since a broken part occurs due to light irradiation in the photo decomposition type alignment film, the film strength after the alignment processing is lower than that before the alignment processing. Generally, the alignment film contains an additive such as a coupling agent for improvement in airtight contact with its substrate. It is considered that in the case of a thin film, as the distance to the substrate is short, the reduction of film strength can be suppressed by the influence of an adhesive force strengthened with the coupling agent or the like.

That is, when the thickness D1 of the first alignment film 8 and the thickness D2 of the second alignment film 18 satisfy conditions as given in the first embodiment, a lower limit value of the amount of light irradiation in formation of the second alignment film 18 can be even lower than that in the conventional technique.

Based on the above-described study, the inventors of the present invention have manufactured plural liquid crystal display panels having different combinations of thickness D1 of the first alignment film 8 and the thickness D2 of the second alignment film 18 and different relative values RoIR of amount of light irradiation in formation of the second alignment film 18, compared the light transmittance and AC after image intensities, and obtained the results as shown in the following Table 2.

TABLE 2

| PT | D1 (nm) | D2 (nm) | RoIR (%) | $TR_{LCD}$ (%) | $\Delta TR$ (%) | $IoS_{AC}$ (%) |
|---|---|---|---|---|---|---|
| PT1 | 100 | 100 | 100 | 4.49 | — | 0.7 |
| PT3 | 100 | 50 | 100 | 4.57 | +0.08 | 0.7 |
| PT6 | 100 | 50 | 50 | 4.70 | +0.21 | 0.9 |
| PT7 | 100 | 50 | 25 | 4.76 | +0.27 | 1.0 |
| PT8 | 100 | 20 | 10 | 4.81 | +0.32 | 0.9 |
| PT5 | 80 | 10 | 100 | 4.67 | +0.18 | 0.7 |
| PT9 | 80 | 20 | 10 | 4.84 | +0.35 | 1.0 |

The liquid crystal panel PT1 in the Table 2 is the liquid crystal display panel as the first comparative example given in the first embodiment, in which the thickness D1 of the first alignment film 8 is 100 nm and the thickness D2 of the second alignment film 18 is 100 nm, and the relative value RoIR of light irradiation amount in formation of the second alignment film 18 is 100%. In the liquid crystal display panel (PT1) as the first and the AC after image intensity $IoS_{AC}$ is 0.7%.

Further, as it is apparent from the Table 2, in the case of the liquid crystal display panel (PT3) where the thickness D1 of the first alignment film 8 is 100 nm, the thickness D2 of the second alignment film 18 is 50 nm, the relative value RoIR of light irradiation amount in formation of the second alignment film 18 is 100%, the light transmittance $TR_{LCD}$ is improved in comparison with the first comparative example, and the AC after image intensity $IoS_{AC}$ is 0.7%. This liquid crystal display panel (PT3) is a liquid crystal display panel satisfying the conditions in the first embodiment in which it is possible to achieve both prevention of reduction of light transmittance and suppression of occurrence of after image.

Further, in the case of the liquid crystal display panel (PT6) where the thickness D1 of the first alignment film 8 is 100 nm, the thickness D2 of the second alignment film 18 is 50 nm, the relative value RoIR of light irradiation amount in formation of the second alignment film 18 is 50%, in the case of the liquid crystal display panel (PT7) where the relative value RoIR of light irradiation amount in formation of the second alignment film 18 is 25%, and in the case of the liquid crystal display panel (PT8) where the relative value RoIR of light irradiation amount in formation of the second alignment film 18 is 10%, respectively, the light transmittance $TR_{LCD}$ is improved in comparison with the liquid crystal display panel as the first embodiment (PT3), and the AC after image intensity $IoS_{AC}$ is equal to or less than 1.0%.

Similarly, in the case of the liquid crystal display panel (PT9) where the thickness D1 of the first alignment film 8 is 80 nm, the thickness D2 of the second alignment film 18 is 20 nm, the relative value RoIR of light irradiation amount in formation of the second alignment film 18 is 10%, the light transmittance $TR_{LCD}$ is improved in comparison with the liquid crystal panel in the first embodiment (PT5) having the same structure as that of this liquid crystal display panel, and the AC after image intensity $IoS_{AC}$ is equal to or less than 1.0%. Further, the differences $\Delta TR$ between the light transmittance $TR_{LCD}$ in the liquid crystal display panel (PT1) as the first comparative example and the light transmittance $TR_{LCD}$ in these liquid crystal display panels (PT6 to PT9) are +0.21%, +0.27% and +0.32% and +0.35%. The differences are greater than those in the liquid crystal display panel in the first embodiment. That is, in the liquid crystal display panel in the second embodiment, it is possible to further improve the light transmittance in comparison with the liquid crystal display panel in the first embodiment.

Accordingly, in the liquid crystal display panel in the second embodiment, it is possible to achieve both prevention of reduction of light transmittance due to coloration of the first alignment film 8 and second alignment film 18 and the suppression of occurrence of after image can be achieved, and the advantage of prevention of reduction of light transmittance due to coloration is higher than that in the first embodiment.

As described above, the present invention has been specifically described based on the above embodiments. However, the present invention is not limited to the above embodiments, and various modifications can be made within a scope without departing from the subject matter.

For example, in the first and second embodiments, as an example of pixel structure, the pixel electrode 16 and the common electrode 14 are laminated via the third insulating layer 15 and the pixel electrode 16 is closer to the liquid crystal layer 3. However, when the pixel electrode 16 and the common electrode 14 are laminated, the arrangement is not limited to this example, but the common electrode 14 may be closer to the liquid crystal layer 3. In this case, the common electrode 14 closer to the liquid crystal layer 3 has a comb teeth shape.

Further, when the pixel electrode 16 and the common electrode 14 are laminated via the third insulating layer 15 and an electrode closer to the liquid crystal layer 3 is comb teeth-shaped, the extending direction of the teeth of the electrode and the number of teeth can be arbitrarily changed.

Further, in the first and second embodiments, as an example of the IPS mode pixel structure, the pixel electrode 16 and the common electrode 14 are laminated via the third insulating layer 15. However, the IPS mode pixel is not limited to this example. For example, the pixel electrode 16 and the common electrode 14 may be provided on the same surface of the insulating layer.

Further, in the first and second embodiments, a so-called transmission type liquid crystal display panel is given. However, the present invention is not limited to this type of liquid crystal display panel, and is also applicable to reflective type and semi transmission type liquid crystal display panels.

What is claimed is:
1. A liquid crystal display device including a liquid crystal display panel including pixels arranged in a dot matrix array,
the liquid crystal display panel including a first substrate, a second substrate, and a liquid crystal layer provided between the first substrate and the second substrate,
the first substrate including a first electrode and a second electrode, an insulating layer disposed between the first electrode and the second electrode, and a first alignment film disposed on the second electrode,
the second substrate including a second alignment film, and
wherein the liquid crystal layer is configured to be controlled by an electric field which is generated between the first electrode and the second electrode,
wherein the first electrode and the second electrode are transparent, and
the first electrode has a planar shape and the second electrode has a comb teeth plane shape,
wherein the first alignment film and the second alignment film comprise, respectively, a photo alignment film formed by irradiating a photo decomposition type insulating film with light,
wherein the second alignment film has a thickness of at least 10 nm and no greater than 50 nm, the thickness of the second alignment film being less than a thickness of the first alignment film, and wherein the thickness of the first alignment film and the second alignment film are measured at a transparent area of the pixel.

2. The liquid crystal display device according to claim 1, wherein the first alignment film has the thickness, measured at the light transparent area of the pixel, of at least 80 nm and no greater than 130 nm.

3. The liquid crystal display device according to claim 2, wherein the thickness of the first alignment film is measured at an insulating layer formed between the first electrode and the second electrode.

4. The liquid crystal display device according to claim 2, wherein a planarized layer is formed over a color filter of the second substrate, and wherein the thickness of the second alignment film is measured at the planarized layer on which the second alignment film is formed.

5. The liquid crystal display device according to claim 1, wherein the thickness of the first alignment film is measured at an insulating layer formed between the first electrode and the second electrode.

6. The liquid crystal display device according to claim 1, wherein a planarized layer is formed over a color filter of the second substrate, and wherein the thickness of the second alignment film is measured at the planarized layer on which the second alignment film is formed.

* * * * *